United States Patent
Zollino et al.

(10) Patent No.: US 8,812,351 B2
(45) Date of Patent: Aug. 19, 2014

(54) METHOD OF ANALYZING CREDIT CARD TRANSACTION DATA

(76) Inventors: Richard Zollino, Ridgefield, CT (US); Pamela Tournier, Redding, CT (US)

(*) Notice: Subject to any disclaimer, the term of this patent is extended or adjusted under 35 U.S.C. 154(b) by 1758 days.

(21) Appl. No.: 11/973,134

(22) Filed: Oct. 5, 2007

(65) Prior Publication Data
US 2008/0086365 A1    Apr. 10, 2008

Related U.S. Application Data

(60) Provisional application No. 60/849,550, filed on Oct. 5, 2006.

(51) Int. Cl.
*G06Q 10/00* (2012.01)

(52) U.S. Cl.
USPC ............................................... 705/10

(58) Field of Classification Search
USPC .............. 705/10, 16, 21, 59, 71; 380/44, 262, 380/278, 279
See application file for complete search history.

(56) References Cited

U.S. PATENT DOCUMENTS

| | | | |
|---|---|---|---|
| 2002/0052776 A1* | 5/2002 | Rothman et al. | 705/10 |
| 2005/0183002 A1* | 8/2005 | Chapus | 715/505 |
| 2006/0020924 A1* | 1/2006 | Lo et al. | 717/127 |

* cited by examiner

*Primary Examiner* — Dante Ravetti
(74) *Attorney, Agent, or Firm* — Cozen O'Connor

(57) ABSTRACT

A method of analyzing debit and credit card transaction data to provide interpretations of customer purchasing patterns for use by third parties, such as financial services marketers, in providing offers and incentives to targeted groups of consumers. Bulk credit card or debit card transaction data that has been gathered for a large sample of cardholders is obtained, a multi-step process is applied to prepare the data for analysis, multiple categories of marketing "intelligence" or decisions are attached to each transaction contained in the bulk transaction data, a summation of all of the different intelligence categories for each cardholder and for the entire sample is performed to create comparative normalizations, and a score in vector form is generated for each customer based on differences or variations in the way in which that customer shops relative to the bulk-derived normalized data for each field or dimension within the comparative normalization.

7 Claims, 3 Drawing Sheets

METHOD OF ANALYZING CREDIT CARD TRANSACTION DATA

RELATED APPLICATIONS

This application claims priority from U.S. Provisional Patent Application Ser. No. 60/849,550 which was filed on Oct. 5, 2006.

BACKGROUND OF THE INVENTION

1. Field of the Invention

The present invention generally relates to the field of targeted marketing and, more particularly, to a method for analyzing bulk debit and credit card transaction data to provide interpretations of customer purchasing patterns for use by third parties, such as financial services marketers, in providing targeted offers and incentives to individual and groups of consumers most likely to positively respond to the offer.

2. Description of Related Art

The market place of today is characterized by fragmentation and a proliferation of consumer choices. In the past, three television networks were able to effectively reach 97 percent of the population with advertisements. However, these three networks alone can no longer effectively reach a broad audience because different retail formats and media channels now serve increasingly narrow audiences.

With the maturation of Internet shopping and the emergence of "on-demand" downloadable content, audience tastes are becoming further sub-divided. Savvy consumers do not hesitate to delete or disregard messages that they may deem irrelevant. In today's marketplace, it is more difficult—but even more critical—to deliver the right message to the right person through the right medium, at the right time.

Promotion industry sources estimate that the average American is bombarded with roughly 3,000 commercial appeals per day. However, most of these commercials are ignored. Consequently, a large portion of ad spending is actually wasted. The need for marketing and targeting intelligence, coupled with the ability to capture masses of consumer behaviors, such as mouse clicks or purchase transactions, has prompted behavioral targeting. Behaviorally-targeted on-line ads outperform contextually targeted ads by 20%. In fact, across all forms of direct media, response from behavioral targeting surpasses "mass-blast" marketing by as much as 20-to-1.

While other behavioral targeting systems rely on website cookies or collecting click-stream data, consumer purchases over the Internet in the year 2006 accounted for only 3.3% of U.S. retail sales according to Census Bureau estimates. The paper trails created by credit and debit card transactions thus provide an even better starting point from which to provide targeted marketing, because the cards capture a comprehensive view of what people actually purchase, on-line and elsewhere.

It is thus apparent that there is a need for a way to provide more accurately targeted marketing materials to consumers based on the actual purchasing patterns of these consumers.

SUMMARY OF THE INVENTION

The present invention is directed to a method for interpreting bulk debit and credit card transaction data to provide interpretations of consumer purchasing patterns for use by third parties, such as financial services marketers, in providing offers and incentives to targeted groups of consumers.

Credit and debit card records can provide a particularly comprehensive view of consumer behavior. In accordance with the inventive method, different consumer shopping styles are characterized based on the information obtained from their credit or debit card purchase records. As a result, it becomes possible for third parties or others to utilize the results of this characterization to target a focused offer or incentive and present it in a relevant way, making marketing dollars work more effectively, while re-directing the offer or incentive away from those with little or no interest in the message.

Based on the premise that "You Are Where You Shop," the method of the invention reorganizes and analyzes credit or debit card transaction data for marketing purposes. Individual merchants at which cardholders shop are classified with different marketing descriptors that describe, for example, the individual's lifestyle, buying motivation, store location and type of marketing inducement that prompted a specific transaction. Upon classification of a multiplicity of transactions, statistical routines are used to enable marketers to characterize an individual's shopping style, needs and motivations and to accurately compare one individual's profile with another individual's profile to determine who should be contacted, and where, when and how to make contact, to encourage further purchases.

The merchants are classified by the kinds of customers that they attract and the specific appeals that they use to attract these customers. As a result, the method of the invention does not require an exchange of sensitive personal customer information. Rather, only a history of where the customer has shopped and a unique but otherwise random identification (ID) code are needed to subsequently enable a credit card issuer to re-link the shopping profile created in accordance with the invention to a particular customer.

The method of the invention thus utilizes a scoring process that creates a quantitative, data-driven way for marketers to understand what it is that motivates particular customers to make specific purchases, and to then apply this insight to extend the "right" offer to the right customer, at the right time, through the most appropriate delivery channel.

Initially, bulk credit card or debit card transaction data that has been gathered for a large sample of cardholders is obtained from, for example, a financial institution that issued the card(s) or that processes the card transaction data. A multi-step process is then used to prepare the data for analysis. Multiple categories of marketing "intelligence" or decisions are attached to each transaction contained in the bulk transaction data. A summation of all of the different intelligence categories for each cardholder and for the entire sample is performed to create comparative normalizations.

A score in vector form is then generated for each customer, based on differences or variations in the way in which that customer shops relative to the bulk-derived normalized data for each field or dimension within the comparative normalization. The vector corresponds in size to the number of fields or dimensions in the comparative normalizations. It is this vector—or the customer characterizations represented by the vector—that may then be provided to third parties, such as financial services marketers, to enable the third parties to provide highly focused offers and incentives to targeted individual and groups of consumers.

The method of the invention thereby permits third parties to provide highly relevant offers and incentives to targeted groups of consumers, while minimizing or eliminating such offers and appeals to what are likely to be disinterested consumers. In addition, the method permits third parties to refine their offers and other commercial communications based on profiles that are created for specific segments of consumer buying psychologies and an understanding of their specific motivational "hot buttons" or triggers. Moreover, third parties are in accordance with the invention able to identify customer segments that may be reached in a less than optimal manner by traditional media to thereby determine the types of non-traditional campaigns and mix of in-store and non-traditional media, such as email and text messaging, which will more readily reach the identified customer segment. Finally, the invention provides a methodology and environment that is privacy protected and operates on the basis of anonymous transaction data.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

The various features, functions and advantages characterizing the invention will be better understood by reference to the detailed description which follows, taken in conjunction with the accompanying drawings, in which.

DETAILED DESCRIPTION OF THE PRESENTLY PREFERRED EMBODIMENTS

Figure 1:
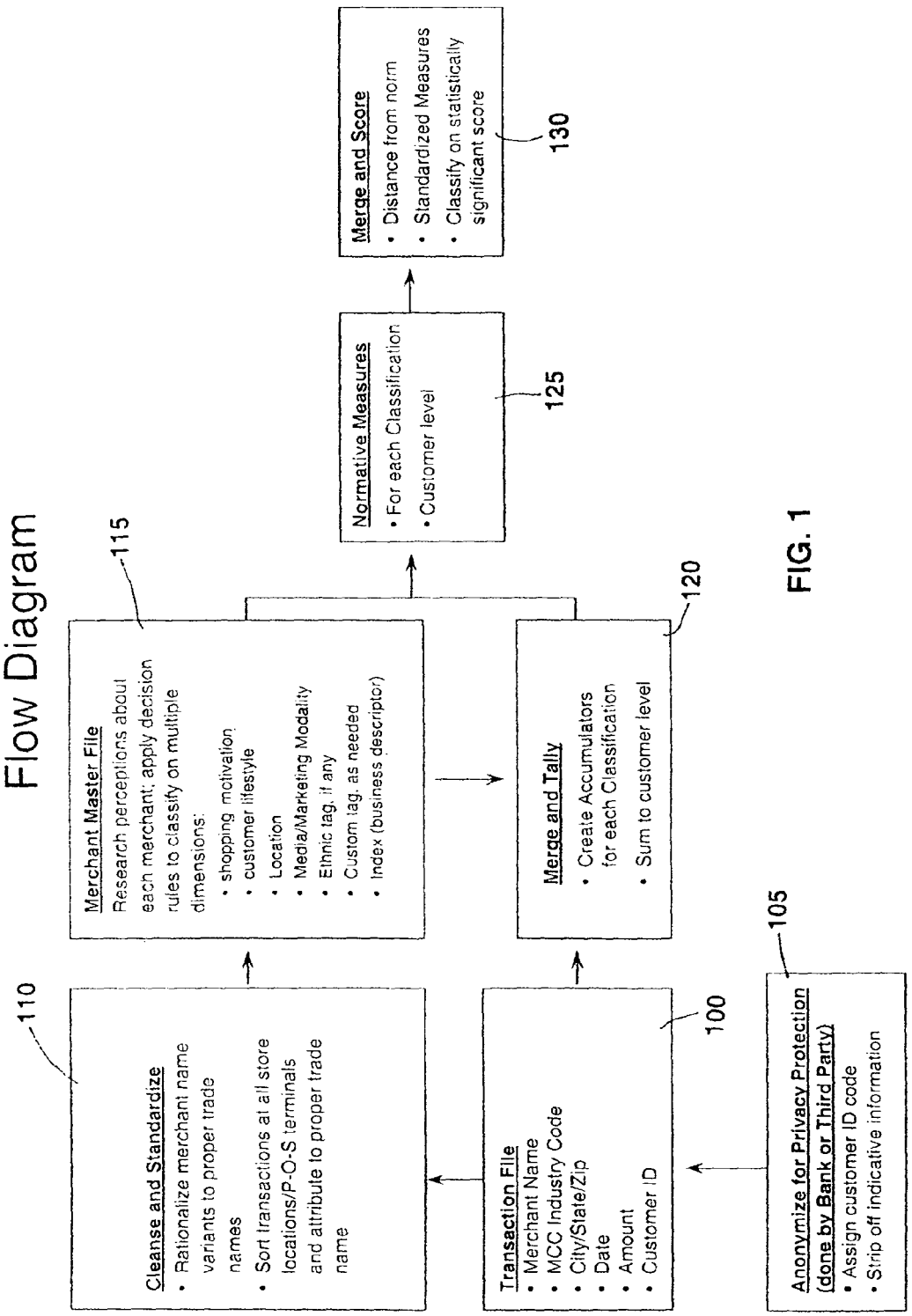
FIG. 1 is an exemplary flow chart illustrating a method in accordance with the invention.
Figure 2:
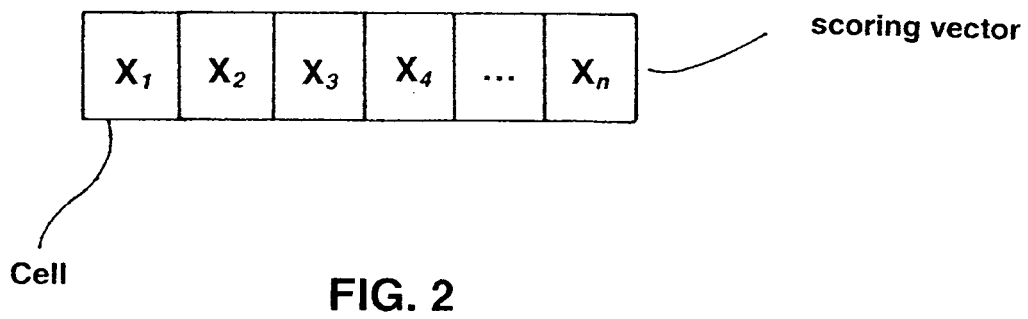
FIG. 2 is an exemplary illustration of a scoring vector in accordance with the invention.

The present invention is primarily directed to a method for analyzing bulk debit and credit card transaction data to provide interpretations of customer purchasing patterns for use by third parties, such as financial services marketers, in providing offers and incentives to targeted individual and groups of consumers. Based on the premise that "You Are Where You Shop", customer-specific data relating by way of example to a customer's interests and lifestyle, shopping motivations and "hot buttons" or triggers, where the customer transacts business, and the information sources and marketing influences reaching the customer with respect to a specific merchant, are derived from the bulk data and organized to provide more accurately targeted marketing guidance and materials for application to specific consumers based on their past purchasing conduct and patterns.

The method of the invention operates based on Level-1 transaction information (i.e., merchant information) which is collected by credit card companies and their associations in order to process such "plastic" transactions. Using inter alia a variety of online and other public information sources that provide consumer opinions, ratings, reviews and feedback about a merchant and/or its primary brand, each merchant name or identifier is "tagged" with additional layers of information as the information sources on transaction files become available. The information tagged to the merchant name may, by way of example, comprise a consumer-recognizable trade name or a brand name of the merchant's best selling product (e.g., in the case of infomercial advertisers), what the merchant represents to its customers, what motivates a customer to shop at a specific merchant, and/or what benefits a customer may seek from the merchant. The merchant name may additionally be tagged with special interests served by the merchant, the kinds of customers that the merchant attracts, the environment in which a transaction occurred, and opinion influences and information sources within and outside of the store that inform the customer about the merchant's products and may affect buying decisions.

In accordance with the invention, each segment of added information is coded using classification-based decisional rules or taxonomies, and these codes are appended to the Level 1 merchant name. Scoring routines that are applied to each customer or account file are then used, which enable marketers to classify an individual according to their interests, their motivations, where and how they transact and how they seek information. Statistical routines and segmentation methods that can analyze scores, where similar customers are grouped together, can also be utilized and applied.

Each merchant is classified and coded under a variety of different frameworks or taxonomies. Each framework is further divided into different sub-categories, fields or dimensions. This classification process results in an enhanced merchant name data file, which in effect characterizes each identified merchant within each of the frameworks or taxonomies. When the enhanced merchant data file is then matched or correlated to actual transaction records, credit and debit card paper trails can be interpreted in a variety of ways that are useful to third parties, such as financial services marketers. However, prior to use of the transaction data records for a match or correlation, the transaction data file is stripped of all name/address information that could be used to identify an individual customer or a particular account number to thereby create an anonymized transaction data file in which each customer is identified only by a unique, typically numeric or alphanumeric, optionally random, identifier. This anonymization of the transaction data file to remove individual customer identification information is typically carried out by the financial institution or other supplier of the bulk transaction data, and is not generally intended to be a part of the inventive method.

The anonymized transaction data file utilized in the practicing the method of the invention thus provides information for each of a large multiplicity of card uses or "swipes". This information will in any event include a customer identifier (ID) code, which is a unique code or identifier assigned by the credit card issuer or transaction processor (i.e. the supplier of the bulk transaction data) but which is not directly linked or associated (except in the bulk data supplier's records) with an account number or social security number or other identifier of the individual; this ensures customer anonymity and privacy during analysis of the data. The bank or other transaction data supplier can then subsequently perform a reverse look-up on the assigned identification code to determine which specific accounts or customers have been determined in accordance with the invention to fall into certain behavioral and motivational segments and, thus, to which such customers appropriate marketing offers can be directed based on the developed transaction profile. The information provided in each record of the anonymized bulk transaction data file may also by way of example include a card or product ID code, a merchant ID code, a transaction date, a transaction time and a transaction dollar amount. The merchant code associates a specific transaction with a specific merchant and its acquired research enhancements. The transaction time may not always be available because this information is typically generated by a different system, i.e., an external authorization system that is used to authenticate individual transactions.

FIG. 1 is a flow chart illustrating the inventive method. Initially, a transaction data file for a sample of customers or credit card holders is obtained from an external source (step 100). The transaction data file may for a multiplicity of customers comprise the individual transaction records of the complete history—e.g. for a particular time period—of each such customer's card swipes, each record including data fields such as merchant name, merchant ID code (i.e. a unique code that enables a debit or credit card transaction to be properly credited to a particular merchant), store number (if available), industry code (e.g., merchant customer code (MCC), North American industry classification system (NAIC) codes, or the like), merchant address (city or DMA code, state, zip code), date of transaction and dollars spent. The MCC code is a standard Visa/Mastercard code that identifies the type of industry to which a merchant belongs.

Other information that may be included in the transaction data file is a flag indicating whether a transaction was charged back or written off. Additional existing or otherwise-gathered transaction record data may also be included at the card issuer's or transaction data-provider's discretion, such as the specific card product involved in the transaction. Moreover, if the transaction occurrence time is available, then a data field associated with this parameter may be presented. Although an exemplary time period covered by the bulk transaction data provided for analysis may be 1 to 2 years, both shorter and longer time periods are also intended to be encompassed and accommodated in the practice of the inventive method.

As discussed above, in order to maintain and assure the individual privacy of the credit card customers, the bulk transaction data that is received in step 100 for analysis has first been anonymized as shown at step 105, although the anonymizing procedure is not generally intended to be viewed as a part of the inventive method and will typically be performed—prior to providing the bulk transaction data for analysis in accordance with the invention—by the entity that from which the transaction information is received, such as a bank or card transaction data processor. In a currently preferred implementation, a card issuer or the like assigns a unique numeric or alphanumeric identifier code ID to each customer to thereby differentiate each customer's multiple transactions in the bulk transaction data file. This identifier code bears no relation to the customer's account number, social security number, or any other personally identifying information that is associated with the swiped credit card or the user thereof. The identifier code thus provides an effective mechanism for protecting customer privacy as the transaction data is subjected to enhancement, analysis and scoring, and assures that only a particular customer's transaction activities and data are utilized in assessing the purchasing habits, proclivities and motivations of that customer.

If the card issuer's customer list must subsequently be matched to an outside or third party consumer/customer list for effective use of the results of the inventive method and analysis, each party may provide its list of customer names and addresses (and the corresponding assigned identifier codes) to a third party processor that can independently compare and match the customer identities with the initially assigned identifier codes. The third party can then forward the listing of matched identities and assigned identifier codes to the card issuer and/or the list owner, so that the card issuer can attach the proper transaction history to the anonymized ID code.

Thus, prior to receipt of the bulk transaction data file for data cleanup, research analysis, enhancement and scoring in accordance with the inventive method as herein described, the card issuer or other supplier of the bulk transaction data "strips-off" all customer-identifying information from the bulk transaction data file, leaving only an identifier code ID to anonymously correlate each individual transaction record with a particular customer.

In the inventive method, the merchant data is first cleaned and standardized (step 110) prior to implementation of the ensuing steps of the method. This initial step is generally necessary because the merchant-identifying data in the transaction records is commonly incorrect or incomplete, whether by virtue of spelling or data entry errors, differences in the manner in which particular merchants internally identify regional, store or checkout locations, or numerous other possible variations. For example, the credit or debit card transaction files of some merchants may associate transactions with a particular cash register or terminal of that merchant, rather than the merchant trade name that would be recognized by a consumer. The merchant name data field may contain numerous inaccuracies and misspellings, or a specific store may appear under the name of an owner, franchisee, family trust or holding company, or as an acronym or nickname. In addition, the merchant name data field may contain or be padded, intentionally or otherwise, with extra or extraneous characters, such as #, *, – or blank spaces. The merchant's name may also be truncated due, for example, to character limitations in the merchant name data field. For example, a "Verizon Wireless" transaction might appear in a data record as Varisen, Verizon, Varizen, or numerous other phonetic variations. Individual stores at a specific location of a chain may be listed with an attached store number, causing them to appear at first glance to identify a different merchant than other stores in the same chain; each of these store locations must nevertheless be properly attributed to the same merchant. Thus, a merchant listed as "Ernie's Gas" might be a Citgo gas station which, accordingly, should be attributed to the Citgo chain. As a consequence, raw merchant names that appear in the merchant name data field and file must be cleaned up and standardized to the one specific tradename that, for example, the customer would easily recognize so that each transaction in the transaction data file can be properly associated for analysis with the consistently correct or appropriate merchant.

Although the exact manner in which the cleanup and standardizing of the merchant identification data field is generally a matter of design choice—and not, therefore, one that requires discussion to enable effective practice of the inventive method—those skilled in the art will recognize that multiple routines and procedures may be used to search merchant name variants as they appear in the merchant name data file or field, to sort the merchant name variants by commonalities in spelling and industry code, and to classify the results as (by way of example) an "Exact Match", "Close Match", "Probable Match" or "Maybe", depending on the number of identified commonalities (step 115). The highest match probabilities occur when spellings slightly diverge but the industry codes match. On the other hand, when both the industry code and spelling diverge widely, a match is unlikely. For example, "Verizon Wireless" with an MCC code of 4812 (i.e., Telecommunications and Equipment) probably identifies the same merchant as the misspelled "Varizen" with the same MCC code of 4812. But a "Varizen" with an MCC code of 4812 is not likely the same merchant as "Varisen Brothers" with an MCC code of 5611 (i.e., Men & Boys' Clothing Store).

The cleanup of the merchant identification data in the bulk transaction file to resolve ambiguities and properly associate transactions that took place at the same merchant or at different locations of the same merchant chain may be carried out in an automated fashion using available or custom software solutions, or manually by persons trained to identify and research and resolve apparent conflicts and ambiguities, or by a combination of automated and manual processes, as a general matter of design choice. The particular methodologies and procedures employed and utilized for this purpose are also general matters of design choice and are beyond and unrelated to the scope or specific requirements of the inventive method. Indeed, if the merchant identifying data present in the bulk transaction data is in a form that does not require cleanup and standardization as described above, then this step 115 can be omitted from the inventive method.

In any event, name variations that denote the same merchant are assigned a unique merchant ID code that identifies the correct merchant assignment—the Standardized Merchant Name—in the merchant name data file. Upon completion of the merchant identifier cleanup and standardizing process, a master merchant file is created for use in performing further analysis and classification of the merchant. If no cleanup and standardization is necessary, then the master merchant file simple corresponds to a listing of all of the unique merchants—each optionally denoted, for convenience, by a numeric or alphanumeric identifier—for use in the inventive method as hereinafter described.

The concept associated with "You Are Where You Shop" is a key factor of the inventive method. The invention is grounded on a recognition that, over time, a consumer's choice of a specific merchant provides a great deal of information with respect to the consumer's values, motivations, wants, needs and lifestyle, and can be used to predict those future purchasing opportunities that are more likely to be of interest to that consumer. However, industry codes alone are unable to adequately capture all, indeed most, aspects of these consumer motivations and choices. The present invention creates and assesses a plurality of different taxonomies or frameworks for describing and classifying each merchant in a manner that becomes advantageously useful to third parties, such for example as financial services marketers. Thus, by analyzing at which merchants a particular consumer has made purchases over a particular period of time, the invention enables a determination of how that consumer is likely to view and react to targeted offers and opportunities based on characteristics that are assigned to each merchant as indicative of the merchant taxonomies. Put another way, each standardized merchant name is classified in accordance with the invention in multiple ways based on information about that merchant, as for example information gathered from publicly available sources (e.g., the Internet) by trained researchers. For each taxonomy, which is intended to denote a characteristic of a particular merchant or a category of related reasons that a particular consumer may decide to patronize that merchant, the merchant is classified within a single field or dimension of that taxonomy.

The invention contemplates the use of multiple taxonomies, such by way of illustrative example as five such taxonomies against which each merchant is evaluated and classified. It should nevertheless be understood and appreciated that it is not the intention to be limited to any specific number of taxonomies, and the use of fewer or greater than five taxonomies are within the intended scope and contemplation of the invention. Indeed, it is intended that, in specific situations, it may be desirable to add one or more additional, e.g. "custom", taxonomies to incorporate merchant information pertaining to a particular specialization of the merchant, the industry and/or the universe of likely customers. In any event, and by way of illustration, the five taxonomy categories "motivations", "lifestyles", "location", "media and marketing modalities", and "ethnic and cultural tags"—together with an additional "index" category as described below—may serve as exemplary descriptors for these multiple categories or taxonomies. Fewer, other and/or additional descriptors may of course be employed as a general matter of design choice and as best suited to a particular application or use of the inventive method.

The information contained in each taxonomy or category may for example be provided by customers reporting why they shop at a particular merchant. The actual source for this information may be developed from customer feedback obtained from surveys and/or published sources including reviews, expert and professional analysis, and comments from individual shoppers. The taxonomy establishes the rules for interpreting and categorizing feedback and commentary associated with the various fields or dimensions within the category.

In the first taxonomy category, i.e., "motivations", different fields or dimensions within the taxonomy are used to denote a range of distinct shopping motivations based on how the consumer perceives his or her risk of transacting with one merchant over another. In certain embodiments, 30 different motivations may be defined, the 30 fields or dimensions being further structured into fundamental classes. In a currently preferred embodiment, the number of fundamental classes for the taxonomy is three.

A first class in such an embodiment, denoted "performance risk", comprises objective attributes which affect perceived utility and functionality, such as "low price", "wide selection", "convenience", "speed of service", "peace of mind" and "reliability". A second class, denoted "social risk", provides an indicator of the consumer's perception of how shopping at a particular merchant will affect the consumer's standing among her peers or family. The fields or dimensions of this second class may include "exclusivity", "trendiness", "sophistication" and "belonging". This second class would thus seek to classify a consumer based on the consumer's perceived level of desire to attain a certain level of exclusivity, trendiness, sophistication and/or to belong to a specific group.

The third class of the "motivations" taxonomy, denoted "self image risk", is intended to provide an indication of the consumer's perception of how shopping at a specific merchant reflects on their image of themselves or on who they wish to be. This third class may include fields or dimensions such as "uncompromising quality", "authenticity" and "value-savvy", and thus seeks to identify whether a consumer is one who seeks uncompromising quality, or authenticity, or is one who is value-savvy.

The "motivations" taxonomy is mutually exclusive and exhaustive, thus forcing classification of each merchant into only a single field or dimension of the "motivations" taxonomy.

The taxonomy "lifestyles" provides a way to use the general class of trade to obtain additional information about customers who visit a specific merchant. For example, sporting goods stores generally attract people who are interested in sports and athletics, children's stores generally attract people with a child in their lives, and merchants selling foundry parts generally cater to small business owners. A merchant that sells industrial chemicals or heavy machinery components typically serves other businesses but generally not consumers. In accordance with the invention, multiple fields or dimensions in the "lifestyles" taxonomy are used to describe differences in the customer base to which a specific merchant caters. In one contemplated embodiment, 16 such fields or dimensions are used to represent these differences; it should be readily appreciated, however, that fewer or greater numbers of fields can be utilized for this purpose. Here, too, the taxonomy forces each merchant to be associated with a single field or dimension of the "lifestyles" taxonomy.

The taxonomy "location" is comprised of fields or dimensions that classify where each transaction occurred, i.e., the retail channel or environment in which the transaction took place. This location may by way of example be a physical store location, such as in a mall or strip mall, on the Internet, as a response to an infomercial, in a peer-to-peer business transaction such as a Tupperware party, on an urban street in a main shopping district or on the highway, through a catalog sale, or in response to a direct mail solicitation. In one embodiment of the inventive method, 12 such different fields or dimensions are used to classify the transaction "location" for a particular merchant, although it will be appreciated that fewer or more fields or dimensions can be employed as a matter of design choice. Here, too, the "location" taxonomy requires that each merchant be classified into a single field or dimension of the taxonomy.

The taxonomy "media and marketing modalities" provides within its taxonomy yet another set of tags or fields, in this case ones that identify certain merchants which, by way of illustrative example, operate points-based "loyalty rewards programs", offer "expert advice" as part of their service, attract customers by "word of mouth" or viral marketing efforts, or provide instant downloads or "media-on-demand". Where a particular merchant does not utilize any of these "media and marketing modalities" as defined by the specified fields, then this taxonomy is left blank for that merchant and, as explained herein, is not used in the subsequent analysis of individual customer transaction records relating to purchases at that merchant.

The fifth taxonomy, "ethnic and cultural", allows those merchants that cater in their business to a particular demographic group—such for example as those following Kosher or vegetarian dietary regimens, or Black, Asian, Hispanic and/or gay & lesbian consumers—to be accorded a separate tag in the appropriate field or dimension. The "ethnic and cultural" taxonomy fields remain blank (and thus unused) for a merchant whose business is not generally directed to customers of any of the identified demographic groups.

The supplemental "index" taxonomy provides a generalized descriptor of the merchant and its reason for existence, its basic consumer appeal, and/or other salient consumer facts. In one embodiment, a 40-character numeric or alphanumeric descriptor is used to represent each merchant in the "index" taxonomy, although a descriptor of this particular length and formulation is of course a matter of design choice. It will be appreciated that there are many hundreds of thousands of U.S. businesses, many unique to a particular town or neighborhood. The taxonomy "index" can thus serve as an additional definitional differentiator to enable marketers to identify common themes in a consumer's shopping patterns that are not otherwise apparent from the other taxonomies or merchant classification codes. Thus, for example, a manager familiar with stores in a particular region of the country may be able, using the additional classification information denoted by the "index" taxonomy, to recognize and understand commonalities in consumer choices in another region at which, by way of illustration, the names of stores in the same or a similar chain may differ from those in the manager's own region.

The creation of the structure and particulars of the multiple taxonomies and of the fields or dimensions within each taxonomy thus yields (step 115) a table or set of tables in which each merchant is defined as associated with particular taxonomies and taxonomy fields within that structure. This is the so-called master merchant file.

The inventive method next performs an enhancement and scoring routine using the entire set of bulk transaction data to generate a scoring vector that provides an indication of a "typical" consumer's tendency toward each dimension or field of a specific taxonomy. The master merchant file is merged with the transaction data records in the bulk file such that the appropriate taxonomy identifiers are appended to each individual transaction within the transaction data file and populated with a 1 or 0 (i.e., a "yes" or "no", or "present" or "absent") based on whether a corresponding field is located in the bulk transaction file for each specific consumer (step 120). The descriptive "index" taxonomy, however, is not used during this enhancement and scoring step. The scoring vector may for example comprise a 1×30 vector, corresponding to an embodiment as described above in which the number of different "motivations" is 30 fields or dimensions that are structured into fundamental classes.

A sum for each of the fields or dimensions within each specific taxonomy is separately computed, and these sums are then totaled, for each individual transaction. Population norms, i.e., a positive value, are computed for each field or dimension, which enables comparison of a particular consumer's behavior in each field or dimension to the norm of a broader population sample by computing the distance from the mean of the sum for each of the fields or dimensions within a taxonomy (step 125). For example, although the transaction data may reveal that a consumer visits Wal-Mart every week, such frequent visits to that merchant may not in itself justify characterizing this consumer as a "money-saving" or thrifty type unless the overall transaction data reveals that the consumer also seeks out additional money-saving opportunities across other retail or merchant venues.

After computation of population norms for each field or dimension within the taxonomy, the distance to a norm is standardized for each field or dimension using a standard normal distribution so that each value for each field or dimension within a specific taxonomy can be directly compared to the values of the other fields (step 130). For a particular customer/cardholder, the greatest standardized distance to the norm—i.e. the field or dimension in which the standardized distance to the norm is greatest relative to the standardized distances to then norm of all of the other fields of that taxonomy—provides the classification of that cardholder in the taxonomy, i.e., a vector of at least one score. In some embodiments, the remaining values or scores of the other fields of the taxonomy can also be used to determine whether a particular cardholder may comprise one to whom a "next best" offer might be extended.

It will be appreciated that the exact manner of generation of the scoring vector can be adjusted based on the industry within which the score vector is intended to be implemented. Moreover, the numeric value or score that is generated may vary based on the way in which the score is generated. Thus, these are all considered to be matters of general design choice that may be implemented in any suitable way using, for example, conventional programming and other available tools of the art.

In any event, on completion of the enhancement and scoring step a vector is created that provides an indication of a consumer's tendency toward a specific field or dimension within each of the taxonomies. It is this vector or score that can be provided for use by third-party or other product and service marketers as an differentiator upon which targeted marketing decisions can be based for the presentation to a consumer of carefully focused messages and solicitations in a manner calculated to produce an enhanced likelihood of a customer response.

Figure 3:
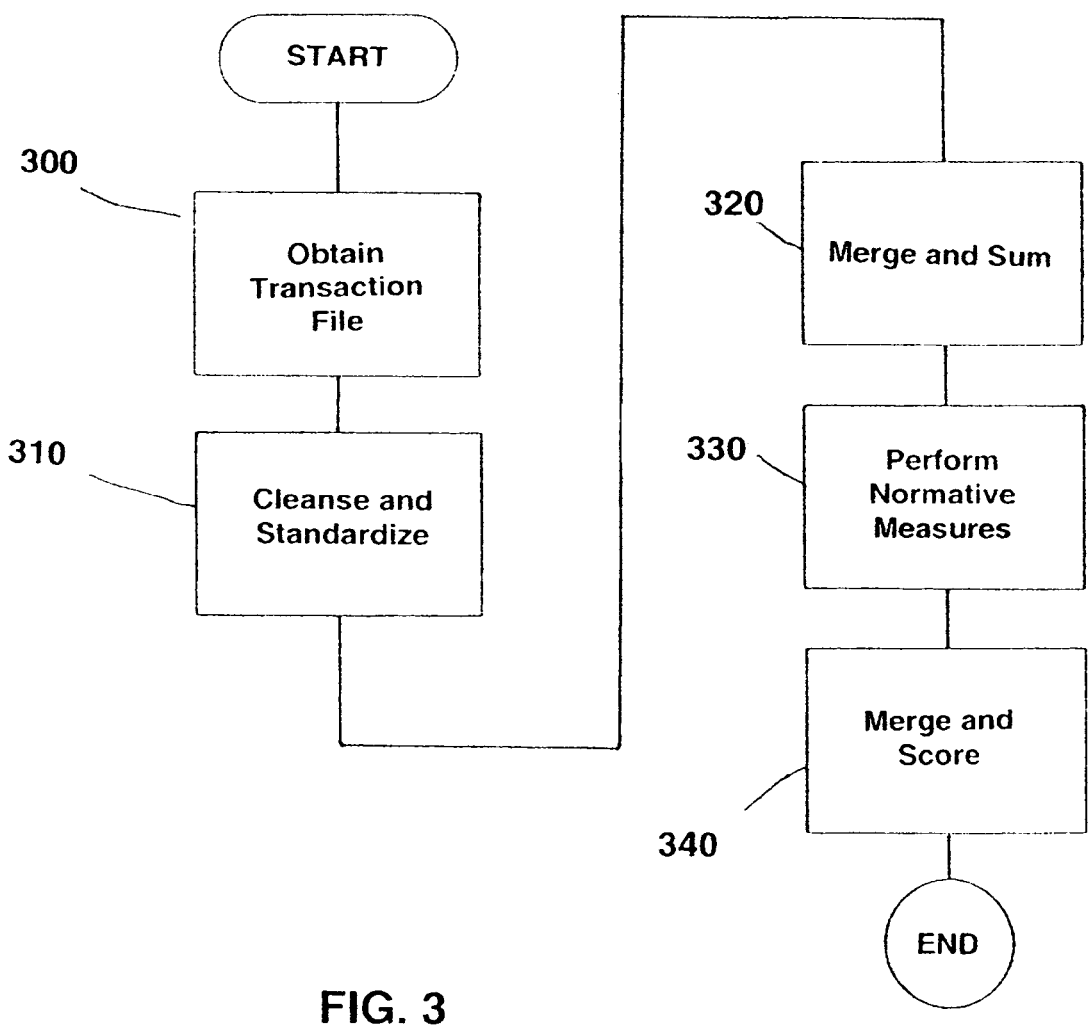
FIG. 3 is an exemplary flow chart illustrating method steps in accordance with the invention.

The structure of an illustrative scoring vector for a single taxonomy is depicted in FIG. 3. Here, the vector is comprised of cells $x_1, x_2, x_3, x_4 \ldots x_n$, where n denotes the number of different fields or dimensions within the taxonomy and x is a positive number that ranges, by way of illustration, in the range of 0 to 1, with a score of 1 indicating a very strong consumer tendency toward that specific field or dimension within the taxonomy. Consequently, one example of such a scoring vector is $0.1_1, 0.1_2, 0.8_3, 0.5_4 \ldots 0.9_n$.

The flow chart of FIG. 3 portrays the method steps of an embodiment of the inventive method. A bulk transaction data file is first obtained from a commercial bank or other card issuing organization or processor, as indicated at step 300. The bulk transaction data file may comprise the transaction records of the complete (or of a predetermined time period) history of each of a plurality of customers' card swipes for a multiplicity of customers, and will typically contain such data fields as merchant name, merchant ID code (i.e. a unique code that enables a debit or credit card transaction to be properly credited to a particular merchant), store number (if available), industry code (e.g., merchant customer code (MCC), North American industry classification system (NAIC) codes, or the like), merchant address (city or DMA code, state, zip code), date of transaction and dollars spent, and preferably anonymous identifying information for the customer to whom each transaction relates.

A merchant name data file is created by cleaning up and standardizing the merchant identifications provided in the merchant identifying fields of the multiple individual transactions records of the bulk data, as shown at step 310. Here, the raw merchant names or identifiers from the merchant name data fields of the customer transaction records are cleaned up and standardized so that every merchant is identified or linked to only a single specific entity—as for example a trade name that a shopper or customer would easily recognize—so that each transaction in the bulk transaction data file can be correctly and uniformly associated with the single appropriate merchant. A master merchant file is thus created for further use in the inventive method.

At this point it is assumed that the various multiple taxonomies and the taxonomy fields or dimensions have previously been developed or created, so that the step of their creation is not shown in the flow chart of FIG. 3. If, on the other hand, the taxonomies structure and details are not already in hand, their creation would be required as a part of the inventive method prior to the next-described step 320.

Next, the master merchant file is merged with the bulk transaction data file to append the appropriate taxonomy and/or custom identifiers to each individual transaction within the bulk transaction data file, and each field or dimension of each taxonomy is populated with a 1 or a 0 to indicate whether a category is or is not, respectively, of relevance to a particular transaction involving each merchant, as indicated at step 320. A sum for each of the fields or dimensions populated with the 1's or 0's for all of the transactions for a particular customer is then computed. In preferred embodiments of the inventive method the resulting sums are normalized for consistency of comparison, as described below, with then corresponding values derived from a broad sample of the entire or otherwise relevant population of consumers.

Population norms, i.e., a positive value, are computed, and preferably normalized, for each field or dimension, as indicated at step 330. Computation of the population norms allows the comparison of an individual customer's purchasing behavior in each field or dimension to the norm of a broader population sample by computing the distance from the mean of the sum for each of the fields or dimensions within a taxonomy. The population norms may for example be computed using the entire universe of data—i.e. of a large multiplicity of customers—from the bulk transaction file or by utilizing a larger or otherwise suitably sampled collection of like data.

A scoring vector that provides an indication of a particular consumer's tendency toward each dimension or field of each taxonomy is then generated, as indicated at step 340. The vector may by way of example comprise a 1×30 scoring vector, corresponding to an embodiment in which the "motivations" taxonomy is subdivided into 30 different fields or dimensions that are further subdivided or structured into several fundamental classes, as previously described.

The scoring vector provides marketers with a useful indicator enabling ready targeting of focused offers or incentives and their presentation in a relevant and appropriate manner, making marketing dollars work more effectively, while redirecting such offers or incentives away from consumers unlikely to have an interest in the offer. The scoring vector may thus be provided to third parties, such as financial services marketers, for use in their extension of tightly focused offers and incentives to targeted groups of consumers based on the relevance scores provided by the scoring vector.

While there have been shown, described and pointed out fundamental novel features of the invention as applied to preferred embodiments thereof, it will be understood that various omissions and substitutions and changes in the form and details of the disclosed methods, and in their practice, may be made by those skilled in the art without departing from the spirit of the invention. Moreover, it should be recognized that methods shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An automated computer-based method of analyzing customer purchase transaction data received from a processor of the transaction data that provides targeted offerings to selected customers identified by the analysis as more likely than other customers to respond to the targeted offerings, wherein the transaction data received from the processor comprises bulk transaction data relating to a multiplicity of purchase transactions effected by a plurality of customers with a plurality of merchants, the bulk transaction data comprising a multiplicity of records each relating to a purchase transaction by one of the plurality of customers and identifying the specific customer and the merchant of the purchase transaction, said method comprising the steps of:

receiving standardized identifiers from a plurality or merchants;

creating a merchant master file comprising a table of the received standardized identifiers from a plurality or merchants;

associating, in the computer, each of said plural merchants in said merchant master file with characterizing fields in a plurality of category taxonomies;

identifying, by the computer, which of said fields are relevant characterizations of each of said plural merchants;

populating, by the computer, said merchant master file with said characterizing fields for each said plural merchant;

receiving, by the computer, bulk transaction data records received from the processor of the transaction data;

correlating, by the computer, the received bulk transaction data records with the associated characterizing fields of said plural merchants in said merchant master file;

generating, by the computer, for each said taxonomy, a first weighted table of the purchase transactions at the plural merchants for each of said characterizing fields of the said each taxonomy;

correlating, by the computer, for each of said plural customers, the purchase transaction data records of said each of the plural customers with the associated characterizing fields of said plural merchants in said merchant master file;

generating, by the computer, for each said taxonomy, a second weighted table of the purchase transactions of the said each of the plural customers at the plural merchants for each of said characterizing fields of the said each taxonomy;

comparing, by the computer, for said each of the plural customers, for each of said characterizing fields of the said each taxonomy, the weights of the first and second tables;

calculating, by the computer, for each of said characterizing fields of the said each taxonomy a difference of said weights of the first weighted table and the second weighted table;

identifying, by the computer, for said each of the plural customers, in said each taxonomy, from among the calculated differences of said weights of the first weighted table and second weighted table for said plural characterizing fields, a greatest value from said calculated differences; and targeting offerings to said each of the plural customers based on the identified greatest value from the calculated differences from the weights of the first weighted table and second weighted table for said plural characterizing fields.

2. A method in accordance with claim 1, wherein said taxonomies comprise one or more of "motivations", "lifestyles", "location", "media and marketing modalities", and "ethnic and cultural tags".

3. A method in accordance with claim 1, wherein said first weighted table comprises, for said each taxonomy, a listing of said fields identifying possible characteristics of the plural merchants and for each said field a value identifying a weighted distribution for said each field representing, by said field characterizations, the multiple purchase transactions of said plural customers at said plural merchants.

4. A method in accordance with claim 1, wherein said second weighted table for said each customer comprises, for said each taxonomy, a listing of said fields identifying the predetermined characteristics of the plural merchants and for each said field a value identifying a weighted distribution for said each field representing, by said field characterizations, the multiple purchase transactions of said each customer at said plural merchants.

5. A method in accordance with claim 3, wherein said second weighted table for said each customer comprises, for said each taxonomy, a listing of said fields identifying the predetermined characteristics of the plural merchants and for each said field a value identifying a weighted distribution for said each field representing, by said field characterizations, the multiple purchase transactions of said each customer at said plural merchants.

6. A method in accordance with claim 5, wherein said comparing step comprises calculating for each of said characterizing fields of the said each taxonomy a difference of said weights by calculating, for each of said characterizing fields of the said each taxonomy, a difference between said identifying value in said first table and said identifying value in said second table.

7. A method in accordance with claim 6, further comprising the step of normalizing the differences calculated for the characterizing fields of the said each taxonomy to create a normalized distribution of said differences to further characterize purchasing characteristics of the said each customer.

* * * * *